(12) United States Patent
Wei

(10) Patent No.: US 7,240,246 B2
(45) Date of Patent: Jul. 3, 2007

(54) AVOIDING NAME COLLISION FOR THE ACPI CONTROL METHODS

(75) Inventor: Dong Wei, Granite Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 543 days.

(21) Appl. No.: 10/737,449

(22) Filed: Dec. 15, 2003

(65) Prior Publication Data

US 2005/0144536 A1 Jun. 30, 2005

(51) Int. Cl.
*G06F 11/00* (2006.01)

(52) U.S. Cl. .......................... 714/47; 714/14

(58) Field of Classification Search .................. 714/14, 714/47; 713/1, 2; 710/9, 10; 719/321–325
See application file for complete search history.

(56) References Cited

U.S. PATENT DOCUMENTS 5,835,735 A 11/1998 Mason et al.
6,292,843 B1 9/2001 Romano
6,877,018 B2 * 4/2005 Oshins et al. ............... 707/206
2005/0138636 A1 * 6/2005 Achtelstetter ............... 719/315

FOREIGN PATENT DOCUMENTS

EP 1286502 A1 2/2003
WO WO 03/069470 A1 8/2003

* cited by examiner

*Primary Examiner*—Robert Beausoliel
*Assistant Examiner*—Charles Ehne

(57) ABSTRACT

Embodiments of the invention provide systems and methods for avoiding name collision for the advanced configuration and power interface (ACPI) control methods. Accordingly, a method embodiment of the present invention comprises, obtaining a ACPI control method reserved name, obtaining a unique first argument, and associating the first argument with the reserved name to form a unique identifier for said specific control method, such that name collisions are avoided by preventing use of a same identifier for different specific control methods.

22 Claims, 3 Drawing Sheets

100

| ARG0 (BUFFER) | UNIQUE IDENTIFIER |
|---|---|
| ARG1 (DWORD) | REVISION IDENTIFIER |
| ARG2 (DWORD) | FUNCTION BITMASK |
| ARG3 (DWORD) | ARGUMENTS DWORDS COUNT |
| ARG4 (DWORD) | RETURN DWORDS COUNT |
| ARG5 (DWORD) | PARAMETER VALUE ARGUMENTS |

100

| ARG0 (BUFFER) | UNIQUE IDENTIFIER |
|---|---|
| ARG1 (DWORD) | REVISION IDENTIFIER |
| ARG2 (DWORD) | FUNCTION BITMASK |
| ARG3 (DWORD) | ARGUMENTS DWORDS COUNT |
| ARG4 (DWORD) | RETURN DWORDS COUNT |
| ARG5 (DWORD) | PARAMETER VALUE ARGUMENTS |

FIG. 1

AVOIDING NAME COLLISION FOR THE ACPI CONTROL METHODS

FIELD OF INVENTION

The present invention generally relates to computer systems and more specifically to systems and methods for avoiding name collision for the ACPI control methods.

BACKGROUND ART

The Advanced Configuration and Power Interface (ACPI) specification is the primary mechanism for providing system configuration information for many of the newer computer systems. ACPI is neither a software specification nor a hardware specification. ACPI is instead an interface specification. ACPI defines the primary runtime interfaces between the operating system (OS) software and the system firmware/hardware on most of the modem computers, especially x86 and Itanium processors. The ACPI specification was developed to establish common industry interfaces, enabling robust operating system directed/controlled device and system configuration and power management. Additionally, ACPI is the key element in Operating System directed configuration and Power Management (OSPM). OSPM is a model of power and system management in which the OS plays a central role and uses global information to optimize system behavior at any given time.

ACPI promotes the concepts of power management and energy conservation by transitioning unused devices into lower power states. ACPI also provides the means for an orderly transition from the legacy system (where most hardware system management is done by the ROM BIOS) to the more modern ACPI based systems, while allowing both systems to coexist.

For the reasons stated above, ACPI based computer systems are becoming increasingly popular and system developers and original equipment manufacturers (OEMs) are in a race to include ever increasing value added features in their products using the ACPI standards.

When designing ACPI based devices and systems, developers must follow the ACPI standards and tools. The ACPI tool kit includes the use of hardware registers implemented on the motherboard, Basic Input Output Software (BIOS) interfaces such as system configuration tables, device enumeration and configuration tools, and executable function interfaces also referred to as control methods.

ACPI control methods are the ACPI objects that system firmware presents to the OS to invoke and evaluate the system and devices status, at runtime. In other words, a control method is a definition of how the OS can perform a certain hardware task, such reading a temperature of a thermal zone on a motherboard. In ACPI, by convention, a control method name is limited to only four characters. Conventionally, there have only been two categories of names for a control method. The first category is the reserved names. These names are referred to as reserved names because their usage is reserved by the ACPI specification. Since reserved names are actually owned by the ACPI Special Interest Group (SIG), permission for their use must be obtained from the SIG group. The reserved name convention dictates that each reserved name starts with the underscore character "_" followed by three characters each of which could be a capital letter (for a total of 26 characters), or a number from 0–9.

The other category of names for a control method is the non-reserved names. As with the reserved names, the non-reserved names can only have four characters, each of which may be one of 26 letters, A–Z, or 10 numbers, 0–9. The total number of permutations of the non-reserved names is thus thirty-six to the power of 4 ($36^4$).

There are many problems associated with the current ACPI naming convention. In the case of reserved names, ACPI SIG has to register these names as referring to a designated control method. But ACPI SIG is not always in session and, thus, consideration of new reserved names can only happen whenever the SIG committee meets to update the ACPI specification. Additionally, in most cases the request for a reserved name must disclose the reasons for its need. This disclosure may violate trade secrets and raise other confidentiality issues.

Another problem with obtaining reserved names from SIG is related to the fact that SIG's focus is toward the baseline features of the standard. As a result, the SIG's responsibility does not typically extend to the value added features many developers may be pursuing.

Yet another issue with ACPI reserved name convention is that because it is limited to three characters, there is a limited number of names that are available for use as a reserved name. This problem is aggravated by the fact that, in most cases, there is a desire to select reserved names that have some meaningful relation to the function of the control method to which they are referring. Thus the real combination of meaningful reserved names is really less than the limited number of possible permutations the characters allow.

Non-reserved names carry many of the same problems. The valid non-reserved names are limited to a combination of four characters. However, the number of practical permutations is significantly less when one considers the constraints of trying to create acronyms that have a meaningful relationship to a designated control method.

Additionally, due to the nature of the interface evolution as, it is impossible that any one person or organization would have visibility into all the control methods being created.

Furthermore, although the non-reserved names do not need the SIG committee's approval, since there is typically no established communication among the entities that create these new control methods, there exists a real possibility of name collision under the current ACPI infrastructure.

Name collision refers to the occurrence where different entities use the same name for control methods that perform different functions.

In ACPI, a definition block contains information about hardware implementation and configuration details, including data and control methods. A device manufacturer can provide one or more definition blocks in the ACPI tables. In each system, all the definition blocks along with their contents (including the control method names) are placed in a hierarchical tree structure, referred to as an ACPI namespace.

As part of a definition block, a control method may be used to characterize various properties and functionalities of a device. If a device manufacturer designed a device that provides vendor specific value-add features but is otherwise compatible with a generic type of device, ACPI uses _HID object to identify the value-add aspect, while also uses _CID object to identify the compatibility with the generic type. Both _HID and _CID objects live in the same scope used to describe this device in the ACPI name space. All control methods for this device are also in this scope The problem of control method name collision is even more apparent in this case.

The control methods associated with the _HID object are designed and defined by the device manufacturer, while the control methods associated with the _CID object are defined for the generic device type, usually by a standards group. The two definition bodies may happen to choose a name for completely different functions. This name collision is even more likely since, in selecting a control method name, most designers choose names that are meaningful acronyms for the control method. Because all the control methods are listed under the same scope in the ACPI name space for a particular system, name collision becomes a real and increasingly likely possibility.

As previously discussed, currently, there are two approaches to address the name collision problem. The first approach is to use a reserved name to refer to a control method. However, obtaining permission to use a reserved name to exclusively refer to a designated control method requires the authorization of the ACPI SIG committee. As mentioned before, the committee is not always in session, the numbers of reserved names are limited and the request for a reserved name may require the divulgence of trade secrets.

The second approach in using non reserved names is problematic, because it involves using the name and relying on chance that no name collision occurs.

Therefore, alternative mechanisms are needed to refer to control methods used under the ACPI specification that avoid the problem of name collision.

SUMMARY OF THE INVENTION

Embodiments of the invention provide systems and methods for avoiding name collision for the advanced configuration and power interface (ACPI) control methods. Accordingly, a method embodiment of the present invention comprises obtaining a ACPI control method reserved name, obtaining a unique first argument, and associating the first argument with the reserved name to form a unique identifier for said specific control method, such that name collisions are avoided by preventing use of a same identifier for different specific control methods.

BRIEF DESCRIPTION OF THE DRAWINGS

The accompanying drawings, which are incorporated in and form a part of this application, illustrate embodiments of the present invention, and together with the description, serve to explain the principles of the invention. Unless noted, the drawings referred to this description should be understood as not being drawn to scale.

FIG. 1 shows a table of the argument formats according to one embodiment of the present invention.

DETAILED DESCRIPTION OF THE INVENTION

Figure 2:
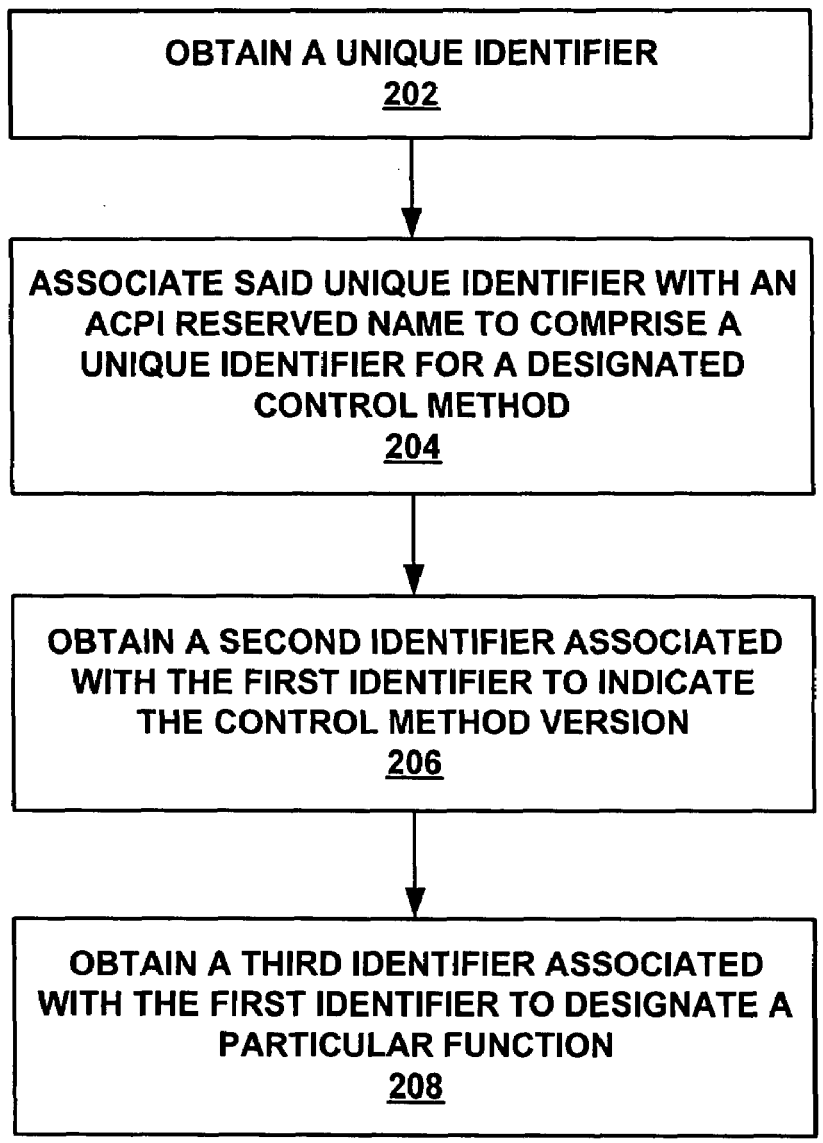
FIG. 2 shows a flowchart of a method of creating a unique control method name according to an embodiment of the present invention.

This invention provides a solution for avoiding name collision of control method names under the ACPI specification. In one embodiment, the solution generally involves creating a unique identifier and associating the unique identifier with an ACPI reserved name with reference to calling a control method.

Under the ACPI specification, the control method calling convention can be best described as call-by-reference-constant. This means that objects are passed to each other as arguments by reference and not by copying. Under a call-by-reference-constant convention, internal objects can be shared across each method invocation. Because a call-by-reference convention allows for a reduced number of objects to be copied, this convention is particulary suited for the low-level nature of the ACPI subsystem within the kernel of a host operating system.

Additionally, under the ACPI convention, the ability of a called method to modify the aguments passed to it is extremly limited. Therefore, in effect, the arguments that are passed to a control method are passed as a constant that cannot be modified except under specific controlled circumstances.

Under ACPI, up to seven arguments may be passed to a control method. Each argument may in turn include a package on its own, referring to other objects and control methods. It should be noted, that as used herein this document, a package refers to a set of objects. An object refers to a node of the ACPI namespace inserted in the tree structure by the OS, using the information provided to it in system definition tables as defined by ACPI.

FIG. 1 shows a table 100 of the argument formats according to one embodiment of the present invention. As shown in table 100 of FIG. 1, the first Argument is referred to as Arg0. In one embodiment of the present invention, the value of Arg0 represents a unique identifier. In one embodiment, this identifier may be a Universal Unique Identifier (UUID). In one embodiment, Arg0 is 16 bytes long or 128 bits. As shown in Table 100 of FIG. 1, the second argument (Arg1) may be a 32 bits value representing a control method revision identification (ID). This revision ID may be used to indicate the version of the particular control method designated.

In one embodiment, the third argument or Arg2 acts as a 32 bits function bit mask. Thus, in one implementation of the present invention, a bit may be set in this argument, representing a given function associated with the unique identifier presented in Arg0. In an alternative embodiment, the value of Arg2 designates a particular function associated with the unique identifier value of Arg0.

The fourth argument or Arg3 may represent the number of parameter values that will be passed to the designated control method in the sixth argument (Arg5).

The fifth argument or Arg4 may represent the number of parameter values that will be returned by the designated control method when called.

Finally, according to an embodiment of the present invention, all the parameter values needed by the designated control method to perform its processing are passed to in the sixth argument or (Arg5). As previously mentioned, the count of parameter values that will be passed to the control method in Arg5 is declared in Arg3, and the count of the parameter values that will be returned by the control method is declared in Arg4.

In one embodiment of the present invention, the seventh argument (Arg6) is not used.

With the above overview in mind, the present invention provides a solution for the ACPI control method name collision problem previously discussed. By using the argument structure presented herein above, a universally unique identifier used in conjunction with an ACPI reserved name may serve as a unique name or reference for a particular control method, avoiding the problem of name collision.

FIG. 2 shows a flowchart of a method of creating a unique control method name according to an embodiment of the present invention. In one embodiment, the method of FIG. 2 is implemented on a computer readable medium. As shown in FIG. 2, in step 202, a unique identifier is created for providing a unique name of a control method. In one embodiment, this unique identifier may be a Universal Unique Identifier (UUID) that is generated automatically using an algorithm or generator that guarantees the uniqueness of the identifier. UUID stands for a Universal Unique IDentifier. There are 128 bit numbers assigned to each identifier. The mechanism used to guarantee that UUIDs are unique is based on the combinations of hardware addresses, time stamps, and random seeds.

There is a reference in the UUID to the hardware address of the first network card on the host that generated the UUID. This reference is intended to ensure the UUID will be unique in space as the Media Access Control (MAC) address of every network card is assigned by a single global authority and is guaranteed to be unique. A MAC address is a hardware address that uniquely identifies each node of a network. The next component of the UUID is a timestamp, which always moves clocks forward, and will be unique in time. Lastly, there is a random component placed into the UUID as a catch-all for uniqueness. An example of a UUID is "58f202ac-22cf-11d1-b12d-002035b29092."

It should be apparent to one skilled in the art that alternative means of generating a unique identifier to be used in referring to a designated control method (object) may be used in conjunction with the present invention. However, for the unique identifier to be global, the only limitation is that the unique identifier generated be guaranteed to be unique and for it to be available to everyone. In the case of the UUID generator, it is guaranteed to generate unique identifiers until the year 3400. Additionally, since each UUID is 128 bits long, the likelihood of a name collision by having all 128 bits to be the same is low even after the year 3400.

As shown in FIG. 2, in operation 204, the unique identifier is associated with an ACPI reserved name to provide a unique control method (object) name under ACPI specification. In one embodiment, the reserved name is _DSM (Device Specific Method). _DSM is a generic, ACPI reserved name, approved by the ACPI SIG committee. Because _DSM is an ACPI reserved name, the name may not be used for purposes other than those approved by the ACPI SIG committee.

The association of the reserved name with the UUID is made during system operation by calling the reserved name and passing to it the unique identifier as an argument. In one embodiment, the unique identifier is passed to the designated control method as the value of a first argument, also referred to as argument zero (Arg0).

The combination of the unique identifier and the reserved name yields a globally unique identifier that may then used to refer to and call a control method directed to a particular function. The possibility of name collision is avoided because each unique identifier is guaranteed to be unique, and thus the combination of the generic reserved name (_DSM) and the unique identifier is unique.

In one embodiment, in operation 206, a second identifier may be associated with the first unique identifier and passed along as the second argument or Arg1. This second identifier may identify the particular version of a given control method. Thus, the value of Arg2 may be a number identifying the designated version of the control method, uniquely identified by the combination of the reserved name, the value of the first argument, and the value of the second argument.

Additionally, in an alternative embodiment, in operation 208, a third identifier may be passed along as the third argument (Arg2) identifying a particular function referred to under the global unique identifier generated in operation 202. In one embodiment, the third argument is 32 bits long and each bit may be used to refer to a single function associated with the unique global identifier. This allows the identification of up to 32 unique functions associated with a single unique identifier. Alternatively, a number value may be used to refer to the designated function. This feature allows for the definition of additional functions, all of which may be associated with a single globally unique identifier such as the UUID.

As previously mentioned, under the ACPI specification, an object may receive up to seven arguments. Thus, in one embodiment of the present invention, the fourth argument, Arg3 may be used to pass a value representing the number of parameters or arguments to be passed to the designated function, in the sixth argument, Arg5. Additionally, the value passed in the fifth argument, Arg4 may be used to identify the number of return values or parameters to be received from the designated control method. Finally, in one embodiment, the sixth argument or Arg5 may be used to pass the actual parameters needed by the designated control method.

Thus, the teachings of the various embodiments of the present invention allows system and device manufacturers and designers to use a reserved name (_DSM in one embodiment) in association with a unique global identifier as a first argument, a unique version number in a second argument, and a unique function identifier in third argument, to create and uniquely reference a designated control method (object) according to the ACPI specification, while avoiding the risk of name collision.

The teachings of the present invention further allow the evolution of a locally defined interface or control method to a regionally and or globally defined interface, without requiring any additional changes.

With the growing popularity of the ACPI specification, an increasing number of system and device manufacturers are using the ACPI based control methods to add value-added features to their designs. In most cases, the intial phase of the development involves a single designer or a group of designers within a company. By using a universal unique identifier such as the UUID, the local design team may insure the selection of a unique name for the ACPI control method that is used to implement the desired value-added features. A universally unique identifier insures that no two independent development groups can come up with the same name to refer to different control methods, performing different functions.

Since the identifier used to reference the locally selected control method name is universally unique, it may easily be adopted regionally and/or globally by other entities, without the risk of causing name collision. This means that a small development group within an unknown company may come up with a control method and an associated name that may be adopted by other groups within the company or even other companies and entities, and the universally unique control method name assures that any use of the unique name would only reference the designated control method developed locally.

Figure 3:
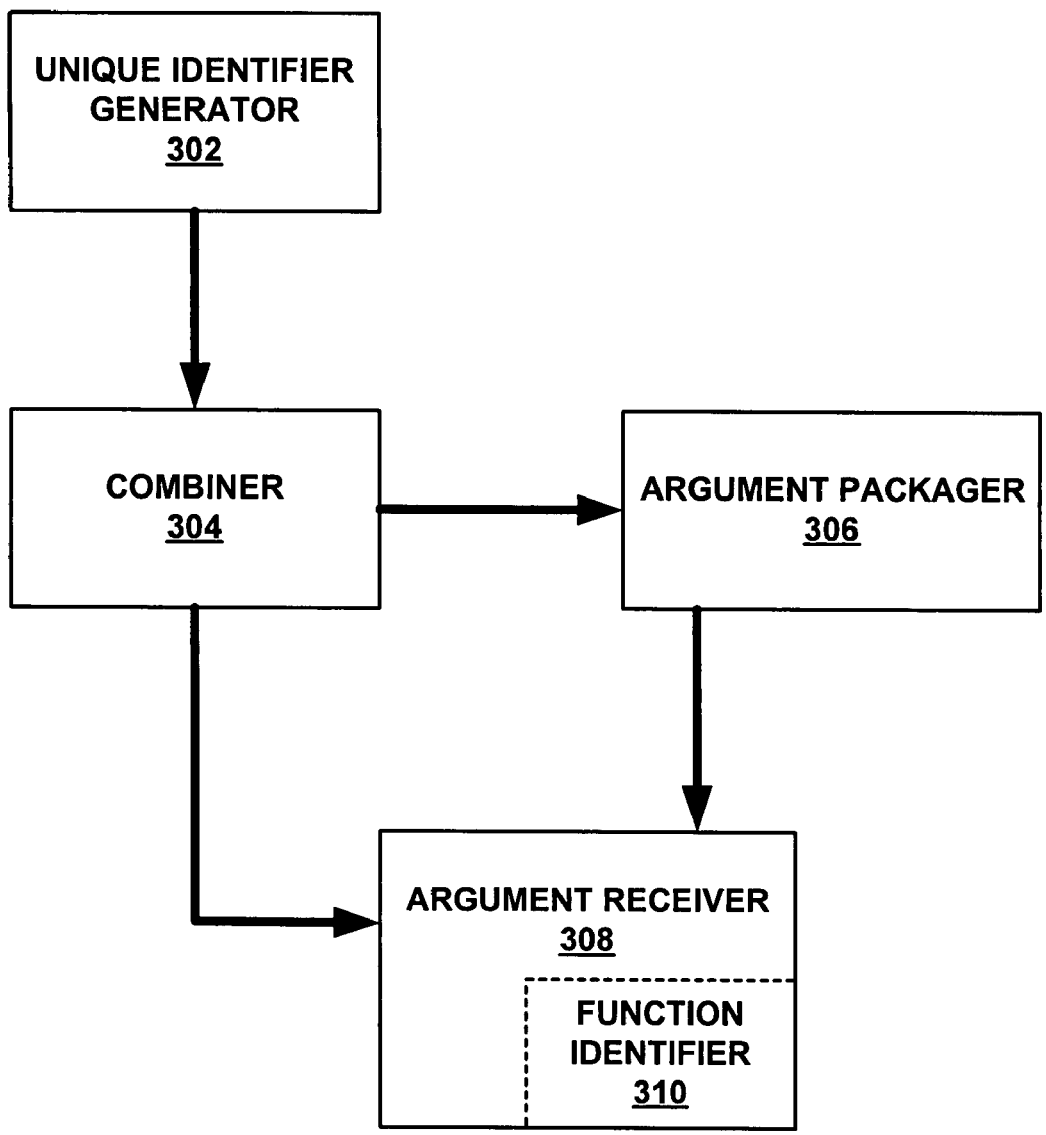
FIG. 3 shows a block diagram of a system of generating a unique ACPI control method name according to an embodiment of the present invention.

FIG. 3 shows a block diagram of a system of generating a unique ACPI control method name according to an embodiment of the present invention.

FIG. 3 shows a system 300 comprising a unique identifier generator 302, a combiner 304, an argument packager 306, and an argument receiver 308. In one embodiment of the present invention, the unique identifier generator 302 is used to create a unique identifier for referencing a designated control method. In one embodiment, the generated identifier may be a universally unique identifier guaranteed to be universally unique. An example of a universally unique identifier is the UUID. The output of the unique identifier generator 302 is coupled to a combiner 304. In one embodiment, the combiner 304 combines an ACPI reserved name with the unique identifier generated by the unique identifier generator 302 to form an ACPI based unique name or reference for a designated control method.

In alternative embodiments of the present invention, in addition to the generated unique identifier, additional identifiers such a version number of the designated control method and a function identifier associated with the particular generated unique identifier may also be combined to form the unique name or reference for a designated control method.

In one embodiment, the output of the combiner is coupled to an argument packager 306 that combines the various identifiers that may comprise the universally unique ACPI name of the designated control method with arguments needed for processing by the control method. In one embodiment, the output of the argument packager 306 is coupled to the argument receiver 308. In an alternative embodiment, the function of the argument packager 306 is integrated into the argument receiver 308.

The argument receiver 308 receives a packaged group of arguments from combiner 304 directly or in an alternative embodiment, through the argument packager 306. The received package may include arguments that provide the parameter values necessary for the designated control method to perform its designed function. Additionally, the package of arguments received by the argument receiver 308 include arguments that are used to identify the designated ACPI control method. In one embodiment, the argument receiver 308 processes the universally unique name it received from the combiner 304 or the argument packager 306 by calling the designated control method. Upon calling the control method, it performs the desired function and provides the desired output to the operating system.

Additionally, the arguments received by the argument receiver 308 may include a version identifier, identifying the particular version of the control method associated with the universally unique identifier. In one embodiment, a single universally unique identifier may be associated with several versions of a control method.

Similarly, an argument received by the argument receiver 308 may identify a particular function associated with the universal unique identifier. In one embodiment, the function identifier acts as a function bit mask, and each bit that is set may identify a different function associated with a single universally unique identifier. In one embodiment, up to 32 functions can be identified in this way. In an alternative embodiment, the value of the function identifier argument identifies a particular function.

In another embodiment, a function identifier logic 310 may be used to identify the designated function based on the value of the function identifier argument received.

Thus, the use of a universally unique identifier and name as a reference for a locally developed control method allows for the adoption of the same name on a regional or global scale, by using the unique name. The use of the locally developed unique ACPI control method name on local, regional and global scale avoids any name collision problems.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

I claim:

1. A method of avoiding name collision for the advanced configuration and power interface (ACPI) control methods comprising:
    obtaining a first argument, wherein said first argument is unique;
    associating said first argument with an a ACPI control method reserved name to comprise a unique identifier for a specific control method, such that name collisions are avoided by preventing use of a same identifier for different specific control methods and
    calling said specific control method using said unique identifier.

2. The method of claim 1 wherein said first argument is associated with said reserved name by being presented as an argument value when calling said control method using said reserve name.

3. The method of claim 1 wherein said first argument is automatically generated.

4. The method of claim 1 wherein said first argument is 128 bits long.

5. The method of claim 1 wherein said first argument is locally, regionally and globally unique.

6. The method of claim 1 further comprising:
    associating a second argument with said first argument, wherein said second argument identifies a version of said specific control method.

7. The method of claim 6 wherein said second argument is 32 bits long.

8. The method of claim 6 further comprising:
    associating a third argument with said first argument, wherein said third argument identifies a function associated with said first unique argument.

9. The method of claim 8 wherein said third argument has a maximum of 32 functions associated with it.

10. The method of claim 8 further comprising:
    associating a fourth argument with said first argument, wherein said fourth argument identifies the number of arguments to be passed to said specific control method identified by said first, second and third arguments.

11. The method of claim 8 further comprising:
    associating a fifth argument with said first argument, wherein said fifth argument identifies the number of arguments to be returned by said specific control method identified by said first, second and third arguments.

12. The method of claim 8 further comprising:
    associating a sixth argument with said first argument, wherein said sixth argument includes all the arguments to be passed to said specific control method identified by said first, second and third arguments.

13. The method of claim 1 wherein the unique identifier is a universal unique identifier (UUID).

14. A computer program embodied on a computer readable medium for avoiding name collision for the advanced configuration and power interface (ACPI) control methods, the computer program causing a computer to perform the steps of:

obtaining a first argument, wherein said first argument is unique to a specific control method;

associating said first argument with a generic reserved ACPI control method name to comprise a unique identifier for said specific control method used by an operating system in invoking said specific control method; and using said unique identifier to invoke said specific control method.

15. The computer program of claim 14 wherein said unique identifier is associated with said reserved name by being presented as an argument value of said control method when called using said reserve name.

16. The computer program of claim 14 wherein said method further comprises:

associating a second argument with said first argument, wherein said second argument identifies a version of said specific control method.

17. The computer program of claim 16 wherein said method further comprises:

associating a third argument with said first argument, wherein said third argument identifies a function associated with said first argument.

18. The computer program of claim 17 wherein said method further comprises:

associating a fourth argument with said first argument, wherein said fourth argument identifies the number of arguments to be passed to said specific control method identified by said first, second and third arguments.

19. The computer program of claim 17 wherein said method further comprises:

associating a fifth argument with said first argument, wherein said fourth argument identifies the number of arguments to be returned by said specific control method identified by said first, second and third arguments.

20. A system for avoiding name collision for advanced configuration and power interface (ACPI) control, said system comprising:

a unique identifier generator operative to generate a universally unique identifier;

a combiner coupled to said unique identifier generator, said combiner operative to combine said unique identifier with a reserved ACPI control method name to form a unique reference to a designated control method; and an argument receiver coupled to said combiner, said argument receiver operative to process said unique reference to identify and call said designated control method.

21. The system of claim 20 further comprising:

an argument packager having an input coupled to an output of said combiner and an output coupled to said argument receiver, said argument packager operative to package arguments for processing by said designated control method.

22. The system of claim 20 wherein said unique reference further comprises:

a control method version number associated with said universally unique identifier; and a control method function identifier, identifying a designated function associated with said universally unique identifier.

* * * * *

UNITED STATES PATENT AND TRADEMARK OFFICE
CERTIFICATE OF CORRECTION

PATENT NO. : 7,240,246 B2 Page 1 of 1
APPLICATION NO. : 10/737449
DATED : July 3, 2007
INVENTOR(S) : Dong Wei It is certified that error appears in the above-identified patent and that said Letters Patent is hereby corrected as shown below:

In column 1, line 19, delete "modem" and insert -- modern --, therefor.

In column 8, line 23, in Claim 1, after "with" delete "an".

In column 8, line 27, in Claim 1, after "methods" insert -- ; --.

Signed and Sealed this

Twelfth Day of August, 2008

JON W. DUDAS
*Director of the United States Patent and Trademark Office*